United States Patent
Tollin et al.

(10) Patent No.: US 11,269,190 B2
(45) Date of Patent: Mar. 8, 2022

(54) LENS FOR EYE-TRACKING APPLICATIONS AND HEAD-WORN DEVICE

(71) Applicant: Tobii AB, Danderyd (SE)

(72) Inventors: Axel Tollin, Danderyd (SE); Daniel Ljunggren, Danderyd (SE)

(73) Assignee: Tobii AB, Danderyd (SE)

( * ) Notice: Subject to any disclaimer, the term of this patent is extended or adjusted under 35 U.S.C. 154(b) by 102 days.

(21) Appl. No.: 16/778,094

(22) Filed: Jan. 31, 2020

(65) Prior Publication Data

US 2020/0393686 A1    Dec. 17, 2020

(51) Int. Cl.
*G02B 27/01* (2006.01)
*G02B 1/14* (2015.01)
*G02B 5/20* (2006.01)

(52) U.S. Cl.
CPC ........... *G02B 27/0179* (2013.01); *G02B 1/14* (2015.01); *G02B 5/208* (2013.01); *G02B 27/0172* (2013.01); *G02B 2027/0138* (2013.01); *G02B 2027/0178* (2013.01); *G02B 2027/0187* (2013.01)

(58) Field of Classification Search
CPC .. G02B 1/14; G02B 5/208; G02B 2027/0138; G02B 2027/0178; G02B 2027/0187; G02B 27/0179; G02B 27/0172; G02B 27/017
USPC ....................................................... 359/350
See application file for complete search history.

(56) References Cited

U.S. PATENT DOCUMENTS

| | | | | |
|---|---|---|---|---|
| 10,168,531 | B1* | 1/2019 | Trail | G02B 27/017 |
| 10,209,517 | B2* | 2/2019 | Popovich | G02B 6/34 |
| 10,423,222 | B2* | 9/2019 | Popovich | G02B 27/0093 |
| 10,718,945 | B2* | 7/2020 | Holland | G02B 27/0172 |
| 10,739,851 | B2* | 8/2020 | Hainzl | G06F 3/0485 |
| 10,802,190 | B2* | 10/2020 | Alexander | G02B 5/32 |
| 2015/0289762 | A1* | 10/2015 | Popovich | A61B 3/113 351/209 |
| 2016/0209657 | A1* | 7/2016 | Popovich | A61B 3/113 |
| 2017/0031160 | A1* | 2/2017 | Popovich | G02B 6/34 |
| 2017/0277259 | A1* | 9/2017 | Mullins | G02B 27/0172 |
| 2018/0113303 | A1* | 4/2018 | Popovich | A61B 3/113 |
| 2019/0041634 | A1* | 2/2019 | Popovich | G02B 6/0035 |
| 2020/0089319 | A1* | 3/2020 | Popovich | G06F 3/013 |
| 2020/0153203 | A1* | 5/2020 | Hatzilias | H01S 5/028 |
| 2020/0386989 | A1* | 12/2020 | Hatzilias | G02B 6/102 |

* cited by examiner

*Primary Examiner* — William R Alexander
(74) *Attorney, Agent, or Firm* — Samuel I. Yamron

(57) ABSTRACT

The present invention relates to a lens for eye-tracking applications. The lens comprises a first protective layer, arranged to face towards the eye to be tracked when the lens is used for eye-tracking. It also comprises at least one light source, at least partly arranged in the first protective layer, arranged to emit a first light from the first protective layer in a direction towards the eye. Moreover, it comprises at least one image capturing device, at least partly arranged in the first protective layer, arranged to receive the first light within the first protective layer. The lens further comprises an absorptive layer, arranged on the far side of the first protective layer seen from the eye to be tracked when the lens is used for eye-tracking, adapted to be absorptive for wavelengths of the majority of the first light.

20 Claims, 3 Drawing Sheets

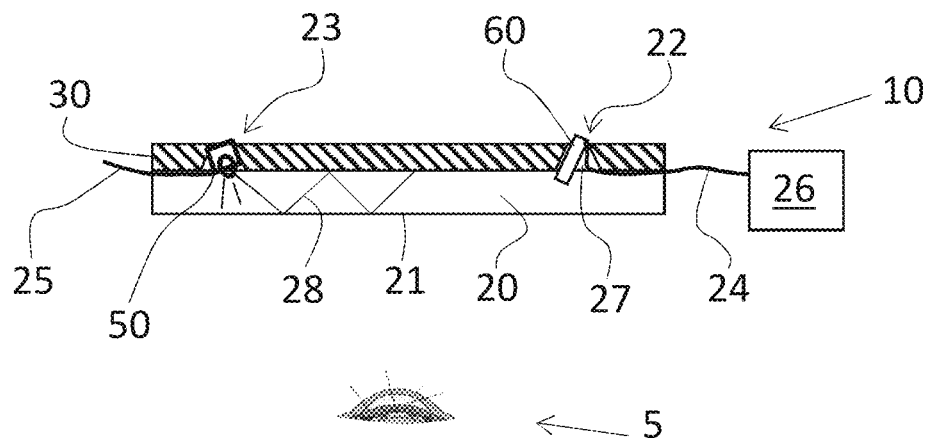
Fig. 3
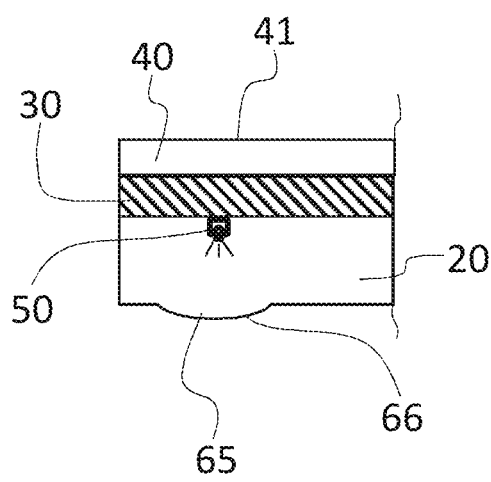
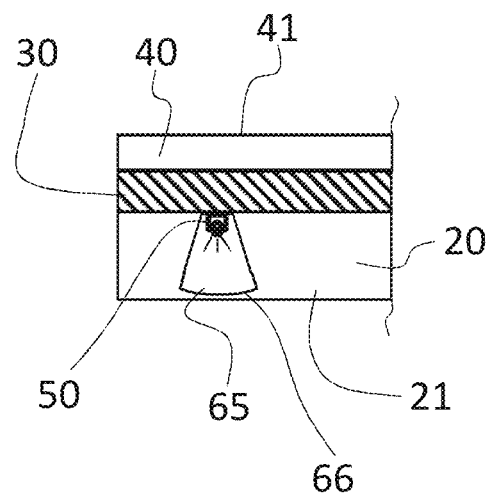
Fig. 4a Fig. 4b

LENS FOR EYE-TRACKING APPLICATIONS AND HEAD-WORN DEVICE

CROSS-REFERENCES TO RELATED APPLICATIONS

This application claims priority to Swedish Application No. 1950118-8, filed Jan. 31, 2019; the content of which are hereby incorporated by reference.

TECHNICAL FIELD

The present disclosure relates to a lens for eye-tracking applications comprising at least one light source and at least one camera. The present disclosure also relates to a head-worn device.

BACKGROUND ART

Eye-tracking is a term for the process of measuring either the point of gaze or the motion of an eye relative to the head. An eye-tracker is a term for a device for measuring eye positions and eye movement. Eye-trackers are commonly used in several fields of research and development, such as physiologically on the visual system, in psychology, in psycholinguistics, marketing, as an input device for human-computer interaction and in product design. There are presently a number of methods for measuring eye movement. One of the emerging variants thereof uses video images from which the eye position is extracted.

Eye-trackers are generally adapted to measure rotations of the eye in one of several ways, but principally they fall into three main categories: measurement of the movement of an object in contact with the eye, optical tracking without direct contact to the eye and measurement of electric potentials using electrodes placed around the eyes.

The optical tracking category mentioned above uses some of the available non-contact, optical methods for measuring eye motion. Emitted light, typically in the infrared wavelength region, is reflected from the eye and sensed by a video camera or some other specially designed optical sensor. The sensed information is then analysed in real time to extract eye movements from changes in reflections.

In conventional head-worn eye-tracking devices, electro-optical components, such as one or more cameras and/or light sources, are usually mounted on a mechanical support structure. Most convenient and a classic solution is to have at least partly covered the frame of a pair of glasses with the mentioned structure onto which the necessary components have been mounted.

An example of such a solution is disclosed in U.S. Pat. No. 9,665,172, which describes a portable eye-tracking device including a frame having a glasses lens attached thereon with, so as to, to the greatest possible extent, resemble a traditional pair of eye-glasses or sunglasses. The frame includes a centrepiece to which the glasses lens is attached and from which sidepieces extend. These sidepieces may fit above the ear of a user in the manner of a traditional pair of eye-glasses or sun glasses. A nose piece is provided for comfort and to assist in fitting of the device to a user's nose. A scene camera, which may capture still and/or video images and/or other image data, is disposed in the glasses lens above the nose piece. To record sound, a microphone may also be placed adjacent or near to the scene camera. A control unit is located within one or both arms (sidepieces).

To the frame is attached a mechanical support structure with optics holding members, usually fixed to the frame of the portable eye-tracking device. The mechanical support structure with optics holding members usually constitutes a visibly and physically obstructive element to the user. This support structure may be perceived as disturbing and less attractive both from functional and esthetical points of view. Mounting fragile and sometimes very sensitive optical and/or electronic components on an extending frame structure may also be undesired from the perspective of strength and durability of the lens and its functional elements, all of which are crucial for a robust and reliable function of an eye-tracking device.

Moreover, at least to date, since eye-tracking technology is now emerging, prior art solutions have not been optimised in terms of cost and efficiency when setting up production facilities for producing eye-tracking devices in a large scale.

SUMMARY OF THE INVENTION

It is an objective of the present disclosure to alleviate at least some of the above named problems of known devices.

It is another objective of the present disclosure to provide a head-worn device which is less physically and/or visibly obstructive to a user.

It is a further objective of the present disclosure to provide an alternative and an improved solution to known devices.

At least one of the above objectives is according to one aspect of the disclosure achieved by a lens for eye-tracking applications. The lens comprises a first protective layer with a first surface, arranged to face towards the eye to be tracked when the lens is used for eye-tracking, and at least one light source, at least partly arranged in contact with the first protective layer, arranged to emit a first light from the first protective layer in a direction towards the eye. The lens also comprises at least one image capturing device, at least partly arranged in contact with the first protective layer, arranged to receive the emitted first light within the first protective layer. The lens further comprises an absorptive layer, arranged on the far side of the first protective layer seen from the eye to be tracked when the lens is used for eye tracking, adapted to be absorptive for the majority of the first light.

The integral configuration according to the present invention allows for arrangement of optical and electrical components inside the lens. Thus, there is no longer a need for a mechanical support structure on the outside of the lens as in prior art. Thus, the lens allows for a construction of lighter and more nimble head-worn eye-tracking devices. Further, the lens enables construction of head-worn eye-tracking devices, which are less visibly impairing and with a more robust construction.

The absorptive layer reduces stray light from the at least one light source. Especially, stray light which might reach the image capturing device can be reduced as it will be absorbed by the absorptive layer.

By arranging the light source in the lens, other components of a head-worn eye-tracking device will obtain a larger degree of freedom regarding their design as they no longer need to support light sources. Especially, these other components can be designed lighter, requiring less space, or can possibly be even completely dispensed with.

The light source may be a light emitting diode, LED, or a laser. Those are the preferred type of light sources as they may be very small and thus easy to implement in the lens.

The absorptive layer may be configured to function also as a supporting layer and to support at least one of the at least one light source and the at least one image capturing device.

The absorptive layer has to be sufficiently strong in order to allow the absorptive layer to function as a supporting layer. This allows for easier production of the lens. However, if the absorptive layer functions as a supporting layer the manufacturing of the lens may be facilitated. The light source and the image capturing device may then be attached to the supporting/absorptive layer in a first step and the first protective layer may be moulded onto the supporting layer in a second step.

The lens may further comprise a supporting layer configured to support at least one of the at least one light source and the at least one image capturing device, wherein the supporting layer is arranged on either side of the absorptive layer. The supporting layer may further be adapted, just like the absorbing layer, to be absorptive for wavelengths of the majority of the first light.

The lens may further comprise a second protective layer provided on the far side of the absorptive layer, seen from the eye. The function of the second protective layer is to further protect the optical and/or electrical components, which are integrally mounted in the lens. Also electrical connections to and from the components are protected from mechanical damage by means of the protective third layer of the lens.

In another example, the lens may further comprise a second protective layer provided on the far side of the supporting layer, seen from the eye, and wherein the second protective layer is the absorptive layer. This allows for facilitated mounting of the lens, since only the second protective layer has to absorptive for the wavelength(s) of the at least one light source. Further, the second protective layer protects the optical and/or electrical components, which are integrally mounted in the lens. Also electrical connections to and from the components are protected from mechanical damage by means of the protective third layer of the lens.

The light source may be adapted to emit the first light essentially at wavelengths in the wavelength range 650-3000 nm, preferably in the wavelength range 750-1400 nm, more preferably in the wavelength range 800-1000 nm, wherein the supporting layer and/or the absorptive layer are adapted to be absorptive for said wavelengths. This enables separation of the wavelengths of the first light, preferably used for eye-tracking, from the wavelengths of visible light which might be used for virtual and/or augmented reality, VR and/or AR.

The supporting layer, the second protective layer and/or the absorptive layer may be essentially transparent for visible wavelengths. This is favourable in that it allows a user to look through the lens, and enables the use of the lens for augmented reality applications.

The lens may comprise a refractive element, which is arranged in the light path of the first light. The refractive element may be, e.g., a micro-lens. This allows to direct the first light in a desired direction and/or to manipulate the first light in a desired way. Further, this reduces the need for any additional components to direct/manipulate the first light, which in its turn reduces the need for additional structures to support the additional components. Just as the reduced distance described above, the arranged refractive element reduces total internal reflection of the first light inside the lens. Advantageously, power consumption is further reduced and stray light is reduced. Since less stray light from the light source will reach an eye-tracking camera, the accuracy of eye-tracking will be further improved.

The surface of the refractive element, arranged to face towards the eye, has a convex shape seen from the light source. Thus, the emission cone of the first light is emitted onto the convex surface with an angle of incidence, which relative to the convex surface is smaller than the critical angle at which total internal reflection would occur. In this way the internal reflections may be minimized and the light which is directed towards the eye may be maximized.

In one embodiment, the at least one refractive element, such as a micro lens, is arranged to narrow the emission cone(s) of the at least one light source. This further reduces power consumption of the at least one light source to provide light of a specific intensity at the eye to be tracked.

The refractive element may be an integral part of the first protective layer and may have a refractive index, which is substantially equal to the refractive index of the first protective layer. This enables the refractive element to be produced when moulding the first protective layer.

At least some of the objectives are according to an aspect of the present disclosure also achieve by a head-worn device. The head-worn device comprises at least one lens for eye-tracking applications according to the present disclosure. The head-worn device has the advantages discussed in relation to the lens.

The head-worn device may be an augmented reality headset, where a transparent display is either integrated into the lens, attached to the lens or arranged in the vicinity of the lens.

The head-worn device may alternatively be a virtual reality headset, comprising a display wherein the lens is either integrated into the display, attached in front of the display or arranged in front of the display.

It should be emphasised that any of the above-described embodiments can be combined. Combinations of these embodiments might provide additional advantages. Further advantages might arise when putting the disclosure into practice or when studying the following detailed description.

BRIEF DESCRIPTION OF THE DRAWINGS

For a more detailed understanding of the present invention and its objects and advantages, reference is made to the following detailed description, which should be read together with the accompanying drawings. Same reference numbers refer to same components in the different figures.

FIG. 3 depicts schematically a lens according to an alternative embodiment to the present disclosure.

FIGS. 4a and 4b shows in an enlarged view a part of the lens and the light according to two alternative embodiments.

DETAILED DESCRIPTION

Figure 1:
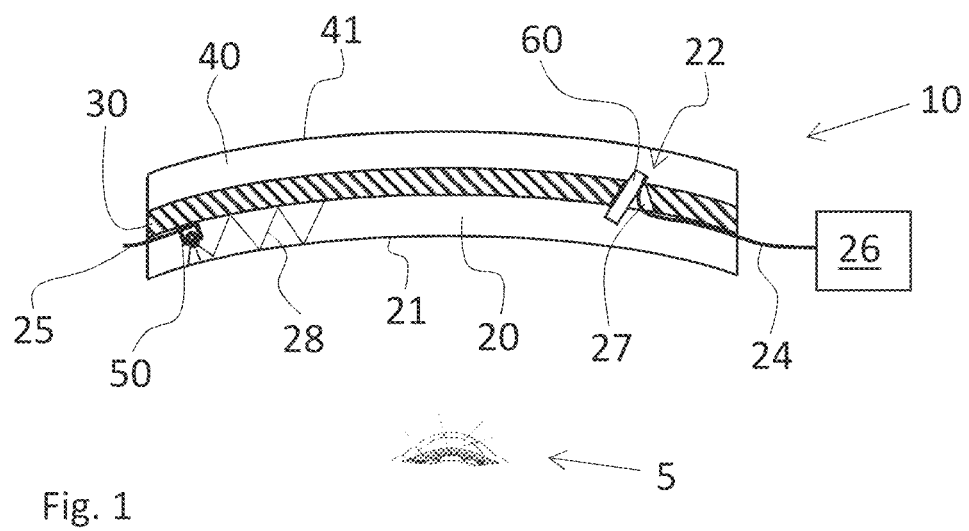
FIG. 1 depicts schematically a lens according to an embodiment of the present disclosure.

FIG. 1 depicts schematically a lens 10 according to an embodiment of the present disclosure. The lens 10 is particularly arranged and intended for eye-tracking applications. The lens comprises a first protective layer 20, arranged to face towards the eye 5 to be tracked when the lens 10 is used for eye-tracking, wherein the first protective layer comprises a first surface 21, arranged to face towards the eye 5 to be tracked when the lens 10 is used for eye-tracking. The first surface 21 may have the shape of a first non-zero curvature.

The lens 10 also comprises a supporting layer 30. The supporting layer 30 is arranged to face away from the eye 5 to be tracked when the lens is used for eye-tracking. Further, the lens 10 may comprise a second protective layer 40 with a second surface 41 arranged to face away from the eye 5 to be tracked when the lens is used for eye-tracking. In this case, the supporting layer 30 is arranged between the first protective layer 20 and the second protective layer 40.

In one example, the supporting layer comprises a first opening 22 between the first protective layer 20 and the second protective layer 40. An electrical component in the form of an image capturing device is arranged extending through the first opening 22. The first opening 22 may have a larger dimension than the image capturing device 60. This allows the angle of the image capturing device 60 to be adjusted during manufacturing of the lens 10. The arrangement of the image capturing device 60 is performed before the arrangement of the first protective layer 20 and the second protective layer 40. After arrangement of the image capturing device in the first opening 22 an optically transmitting adhesive 27 may be applied to fill out the remainder of the first opening. A first cable 24 is connected to the image capturing device 60. The first cable 24 may extend from the imaging device 60 in contact with the supporting layer between the supporting layer and the first surface 21 to the outside of the lens 10. This enables connection of the image capturing device 60 to a control unit 26. The image capturing device 60 comprises an image sensor, such as a CMOS sensor or CCD sensor; RGB colour sensor; infrared sensor or similar. The image capturing device 60 also comprises any necessary optical elements for focusing of the incident light from the eye 5.

The first protective layer 20 and the second protective layer 40 of the lens 10 consists of materials such as glass and/or one or several polymers, comprising for example plastic, acrylic glass, polycarbonate, polyethylene terephthalate or polyepoxides. The supporting layer 30 may comprise a suitable polymer. Examples of materials for the different layers 20, 30, 40, 70, include: glass and/or one or several polymers, comprising for example plastic, acrylic glass, polycarbonate, polyethylene terephthalate or polyepoxides.

The thickness of the first protective layer 20 may be in the range 50-2000 µm, preferably in the range 100-1500 µm, more preferably in the range 100-1000 µm, and most preferred in the range 100-500 µm.

The lens 10 also comprises a light source 50, which in the embodiment shown in FIG. 1 is attached to the supporting layer 30 and is arranged within the first protective layer 20. The light source 50 is arranged to emit a first light through the first surface 21 towards the eye 5, and most preferably towards the cornea of the eye 5. The image capturing device 60 is directed towards the eye 5 and most preferably towards the cornea of the eye to capture the first light. In order to achieve a clear signal the light source 50 is arranged to emit light in a specific wavelength band, and the image capturing device 60 is arranged to capture light in the same wavelength band. The light source 50 may be adapted to emit the first light essentially at wavelengths in the wavelength range 650-3000 nm, preferably in the wavelength range 750-1400 nm, more preferably in the wavelength range 800-1000 nm. The image capturing device 60 captures images of the eye during movement of the eye in order the track the movement of the eye in a manner known per se from prior art eye-tracking systems.

Due to the higher refractive index of the material in the first protective layer compared to the refractive index of the air on the outside of the first surface 21 some of the first light will be subject to total internal reflection as is shown by the line 28. If the first light reaches the image capturing device it will deteriorate the image captured by the image capturing device 60. In order to avoid that some of the first light reaches the image capturing device 60 the supporting layer 30 may be adapted to be absorptive for the majority of wavelengths of the first light. In other words, if the first light is in a wavelength band, e.g., in the range 750-1400 nm, the absorptive layer should be adapted to be absorptive in the same wavelength band. As an example, if the light source 50 emits light at a wavelength around 900 nm the absorptive the supporting layer 30 is adapted to be absorptive at least around 900 nm. This will prevent the first light from reaching the image capturing device 60. The supporting layer is preferably transparent at visible wavelengths to enable for a user to look through the lens 10. The supporting layer 30 of the lens 10 may be provided with an absorbing dye, in order to absorb the first light. As an alternative the second protective layer 40, instead of the supporting layer 30, may function as an absorptive layer. Thus, the second protective layer 40 of the lens 10 may be provided with an absorbing dye, in order to absorb the first light, while transmitting visible light.

The lens 10 also comprises a second cable 25 connected to the light source. The second cable 25 may extend from the light source 50, between the supporting layer 30 and the first surface 21 in contact with the supporting layer 30, to the outside of the lens 10. The second cable 25 may be connected to the control unit 26.

The control unit 26 controls the light source 50 and the image capturing device and may be adapted to communicate with other equipment, such as a computer, by wire or wirelessly. The first cable 24 and the second cable 25 provide data and/or power supply. The data and/or power supply is preferably connected to the potential of the light source and/or the image capturing device, such as a camera.

Figure 2:
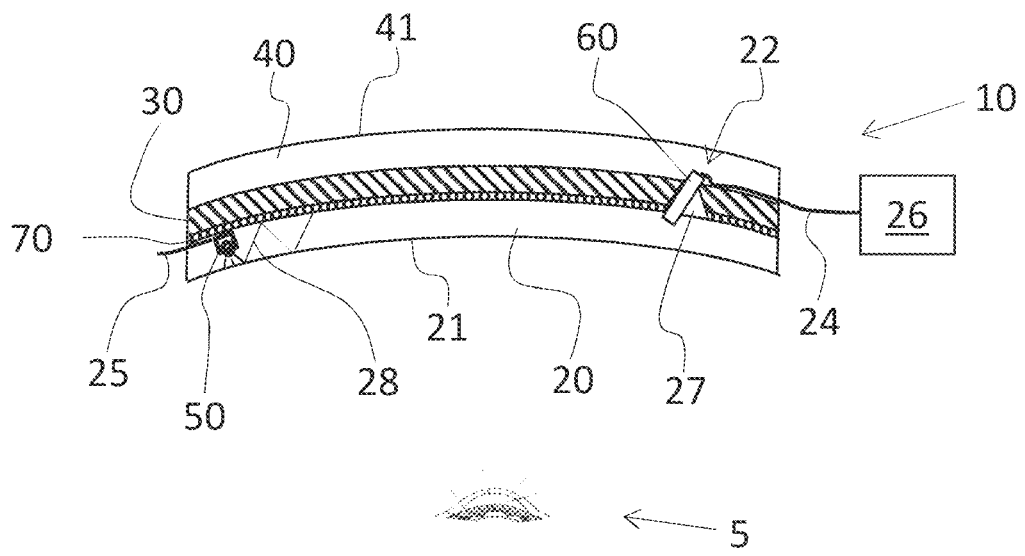
FIG. 2 depicts schematically a lens according to an alternative embodiment to the present disclosure.

FIG. 2 depicts schematically a lens according to an alternative embodiment to the present disclosure. One difference compared to the lens 10 shown in FIG. 1 is that the lens 10 of FIG. 2 is that the lens in FIG. 2 comprises a separate absorptive layer 70. The absorptive layer 70 is adapted to be absorptive for the wavelengths of the first light emitted by the first light source 50. Both the supporting layer 30 and the absorptive layer 70 are essentially transparent for visible wavelengths to allow a user to look through the lens. In FIG. 2 the first cable 24 is arranged on the other side of the supporting layer 30 compared to the lens 10 in FIG. 1, i.e., between the supporting layer 30 and the second surface 41. The absorptive layer 70 is provided with an absorbing dye, in order to absorb the first light, which has been reflected by total internal reflection. It is possible to have the absorptive layer 70 and the supporting layer 30 in the other order, i.e., to have the supporting layer 30 between the absorptive layer 70 and the first protective layer 20. The second protective layer 40 provides a protection for the back of the image capturing device 60.

FIG. 3 shows schematically a lens according to an alternative embodiment to the present disclosure. In FIG. 3 the lens 10 comprises only a first protective layer 20 and a supporting layer 30. The supporting layer 30 is an absorptive layer adapted to absorb the part of the first light, which is reflected in total internal reflection. The lens in FIG. 3 may comprise a second opening 23. The light source is arranged to extend through the second opening. The second opening increases the possibility to adjust the direction of the first light. The lens 10 may be flat. This embodiment is especially interesting when the invention is used in VR headsets. VR headset may or may not comprise a separate lens. Thus, potentially the lens 10 in FIG. 3 could be the display.

The lens including all of its layers has a thickness in the range of 1-10 mm, preferably 3-5 mm. It is possible to have the lens even thicker, but the weight of the lens might become an issue then. It may also be possible to produce the lens thinner than 1 mm if future image capturing devices exhibit smaller dimensions than the present image capturing devices.

FIGS. 4 *a* and 4*b* FIGS. 4*a* and 4*b* shows in an enlarged view a part of the lens 10 and the light source 50 according to two alternative embodiments. The light source may be for example be a light emitting diode, LED, or a laser. Most light emitting diodes LEDs currently available on the market are produced from materials with a refractive index close to the refractive index of the material of the first protective layer in which the light emitting diode is to be arranged. The focussing function provided by the dome shape of the lens gets lost and is therefore in an alternative embodiment replaced by the dome-shaped micro lens, a lens that is attached onto the first surface 21 on the first protective layer 20. The lens 10 has the dual function of focussing the first light emitted from the light source 50 and reducing internal reflection. This is shown in FIG. 4*a*. As can be seen in FIG. 4*a* where a refractive element 65 is arranged in front of the light source 50. The refractive element 65 has a curved surface 66. The refractive element 65 may be integral with the first protective layer 20 or be attached to the outside of the first protective layer 20. The refractive element preferably has the same refractive index as the first protective layer 20. The curved surface 66 of the refractive element 65 has, seen from the light source 5, a convex shape, such that the emission cone of the first light is emitted onto the curved surface 66 with an angle of incidence, which relative to the curved surface 66 is smaller than the critical angle at which total internal reflection would occur. Thus, because stray light with large angles of incidence in relation to the inner surface of the lens are reduced, internal reflections are minimised. In other words, less light will fall on the inner surface with an angle of incident larger than the critical angle, due to the curved surface 66 of the 65 refractive element 65.

FIG. 4*b* shows an alternative embodiment with a refractive element that narrows the emission cone from the at least one light source 50. The refractive element 65 is integral with the first protective lens 20 so that it does not protrude out of the first surface 21. The refractive element 65 has a curved surface 66. The refractive element 65 may have a refractive index that is 15-100% higher than the refractive index of the first protective layer 20. Preferably, the refractive element 65 may have a refractive index that is 30-50% higher than the refractive index of the first protective layer 20. The curved surface 66 of the refractive element 65 has, seen from the light source 5, a convex shape, such that the emission cone of the first light is emitted onto the curved surface 66 with an angle of incidence, which relative to the curved surface 66 is smaller than the critical angle at which total internal reflection would occur.

Figure 5A:
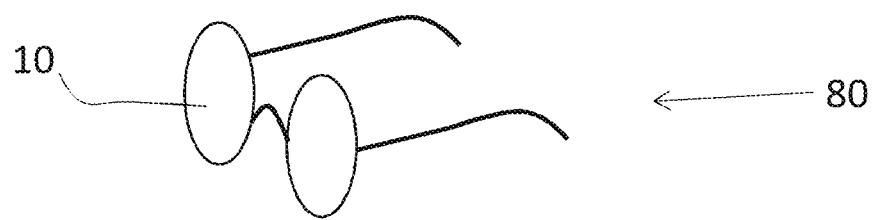
FIGS. 5a, 5b and 5c depicts schematically different embodiments of head-worn devices according to the present disclosure.
Figure 5B:
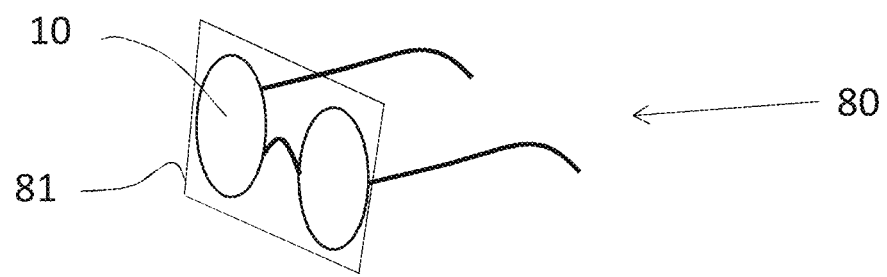
Figure 5C:
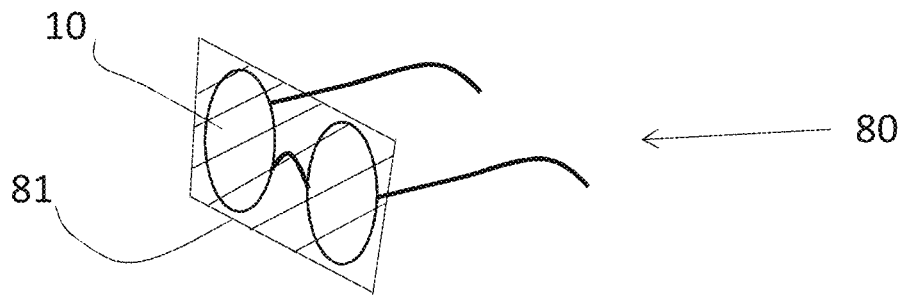

FIG. 5 depicts schematically different embodiments of a head-worn device 80 according to an embodiment of the present disclosure. The head-worn device 80 can be glasses (FIG. 5*a*) for eye-tracking (without display); an augmented reality headset (FIG. 5*b*), where a transparent display 81 is either integrated into the lens, attached to the lens or arranged in the vicinity of the lens; or a virtual reality headset (FIG. 5*c*), comprising a display 81 wherein the lens is either integrated into the display, attached in front of the display or arranged in front of the display.

The described embodiments may be amended in many ways without departing from the scope of the present invention, which is limited only by the appended claims.

The invention claimed is:

1. A lens for eye-tracking applications, the lens comprising:
   a first protective layer with a first surface, arranged to face towards the eye to be tracked when the lens is used for eye-tracking,
   at least one light source, at least partly arranged in contact with the first protective layer, arranged to emit a first light from the first protective layer in a direction towards the eye,
   at least one image capturing device, at least partly arranged in contact with the first protective layer, arranged to receive the emitted first light within the first protective layer,
   wherein the lens further comprises an absorptive layer, arranged on the far side of the first protective layer seen from the eye to be tracked when the lens is used for eye-tracking, adapted to be absorptive for the majority of the first light.

2. The lens according to claim 1, wherein the light source is a light emitting diode, LED, or a laser.

3. The lens according to claim 1, wherein the absorptive layer is configured to function also as a supporting layer and to support at least one of the at least one light source and the at least one image capturing device.

4. The lens according to claim 1, wherein the lens further comprises a supporting layer configured to support at least one of the at least one light source and the at least one image capturing device, wherein the supporting layer is arranged on either side of the absorptive layer.

5. The lens according to claim 1, wherein a second protective layer is provided on the far side of the absorptive layer, seen from the eye.

6. The lens according to claim 1, wherein a second protective layer is provided on the far side of the supporting layer, seen from the eye, and wherein the second protective layer is the absorptive layer.

7. The lens according to claim 1, wherein the light source is adapted to emit the first light essentially at wavelengths in the wavelength range 650-3000 nm, preferably in the wavelength range 750-1400 nm, more preferably in the wavelength range 800-1000 nm, and wherein the supporting layer and/or the absorptive layer are adapted to be absorptive for said wavelengths.

8. The lens according to claim 1, wherein the supporting layer, the second protective layer and/or the absorptive layer are essentially transparent for visible wavelengths.

9. The lens according to claim 1, wherein a refractive element, is arranged in the light path of the first light.

10. The lens according to claim 9, wherein the surface of the refractive element, arranged to face towards the eye, has a convex shape, such that the emission cone of the first light is emitted onto the convex surface with an angle of incidence, which relative to the convex surface is smaller than the critical angle at which total internal reflection would occur.

11. The lens according to claim 10, wherein the refractive element is an integral part of the first protective layer and has a refractive index, which is substantially equal to the refractive index of the first protective layer.

12. A head-worn device, with eye-tracking capability comprising:
   at least one lens for eye-tracking applications wherein the lens has a first protective layer with a first surface, arranged to face towards the eye to be tracked when the lens is used for eye-tracking;
      at least one light source, at least partly arranged in contact with the first protective layer, arranged to emit a first light from the first protective layer in a direction towards the eye;
      at least one image capturing device, at least partly arranged in contact with the first protective layer, arranged to receive the emitted first light within the first protective layer; and
      wherein the lens further comprises an absorptive layer, arranged on the far side of the first protective layer seen from the eye to be tracked when the lens is used for eye-tracking, adapted to be absorptive for the majority of the first light.

13. The head-worn device according to claim 12, wherein the head-worn device is an augmented reality headset, where a transparent display is either integrated into the lens, attached to the lens or arranged in the vicinity of the lens.

14. The head-worn device according to claim 12, wherein the head-worn device is a virtual reality headset, comprising a display wherein the lens is either integrated into the display, attached in front of the display or arranged in front of the display.

15. An eye tracking system comprising:
   at least one lens for eye-tracking applications wherein the lens has a first protective layer with a first surface, arranged to face towards the eye to be tracked when the lens is used for eye-tracking;
   at least one light source, at least partly arranged in contact with the first protective layer, arranged to emit a first light from the first protective layer in a direction towards the eye;
   at least one image capturing device, at least partly arranged in contact with the first protective layer, arranged to receive the emitted first light within the first protective layer; and
   wherein the lens further comprises an absorptive layer, arranged on the far side of the first protective layer seen from the eye to be tracked when the lens is used for eye-tracking, adapted to be absorptive for the majority of the first light.

16. The eye tracking system according to claim 15, wherein a refractive element, is arranged in the light path of the first light.

17. The eye tracking system according to claim 16, wherein the surface of the refractive element, arranged to face towards the eye, has a convex shape, such that the emission cone of the first light is emitted onto the convex surface with an angle of incidence, which relative to the convex surface is smaller than the critical angle at which total internal reflection would occur.

18. The eye tracking system according to claim 17, wherein the refractive element is an integral part of the first protective layer and has a refractive index, which is substantially equal to the refractive index of the first protective layer.

19. The eye tracking system according to claim 15, wherein the lens further comprises a supporting layer configured to support at least one of the at least one light source and the at least one image capturing device, wherein the supporting layer is arranged on either side of the absorptive layer.

20. The eye tracking system according to claim 15, wherein a second protective layer is provided on the far side of the absorptive layer, seen from the eye.

* * * * *